(12) United States Patent
Vierkotten et al.

(10) Patent No.: US 10,046,955 B2
(45) Date of Patent: Aug. 14, 2018

(54) LARGE MANIPULATOR HAVING AN ARTICULATED MAST AND HAVING MEANS FOR MEASURING ANGLES OF ROTATION

(71) Applicant: Schwing GmbH, Herne (DE)

(72) Inventors: Reiner Vierkotten, Oberhausen (DE); Carsten Conrad, Recklinghausen (DE)

(73) Assignee: SCHWING GMBH, Herne (DE)

( * ) Notice: Subject to any disclaimer, the term of this patent is extended or adjusted under 35 U.S.C. 154(b) by 0 days.

(21) Appl. No.: 15/311,426

(22) PCT Filed: May 15, 2015

(86) PCT No.: PCT/EP2015/060752
§ 371 (c)(1),
(2) Date: Nov. 15, 2016

(87) PCT Pub. No.: WO2015/173385
PCT Pub. Date: Nov. 19, 2015

(65) Prior Publication Data
US 2017/0081154 A1    Mar. 23, 2017

(30) Foreign Application Priority Data

May 15, 2014 (DE) .................. 10 2014 007 071

(51) Int. Cl.
*B66C 13/46* (2006.01)
*E04G 21/04* (2006.01)
(Continued)

(52) U.S. Cl.
CPC .............. *B66C 13/46* (2013.01); *B66C 23/54* (2013.01); *E04G 21/0436* (2013.01); *E04G 21/0463* (2013.01); *G01D 5/145* (2013.01)

(58) Field of Classification Search
CPC combination set(s) only.
See application file for complete search history.

(56) References Cited

U.S. PATENT DOCUMENTS 6,202,013 B1    3/2001  Anderson et al.
8,281,811 B2 *  10/2012  Rau ........................... B66C 1/44
                                                       137/556
(Continued)

FOREIGN PATENT DOCUMENTS

DE         10240180 A1      3/2004
DE       102010027635 A1    1/2012
(Continued)

OTHER PUBLICATIONS

International Search Report issued in International Application No. PCT/EP2015/060752, dated Sep. 7, 2015, 3 pages.

*Primary Examiner* — Anne M Antonucci
*Assistant Examiner* — Renee LaRose
(74) *Attorney, Agent, or Firm* — Faegre Baker Daniels LLP

(57) ABSTRACT

An extendable folding boom includes a turntable rotatable about a vertical axis, a plurality of boom segments pivotable at folding joints about respectively horizontal folding axes with respect to an adjacent boom segment or the turntable, and a sensor configured to sense a folding angle between two adjacent boom segments or between a boom segment and the turntable. The sensor includes a field-generating element and a field-sensing element spaced apart from each other along a horizontal axis in a contactless arrangement.

15 Claims, 3 Drawing Sheets

(51) Int. Cl.
*G01D 5/14* (2006.01)
*B66C 23/00* (2006.01)

(56) References Cited

U.S. PATENT DOCUMENTS

| | | | | |
|---|---|---|---|---|
| 2005/0224439 A1* | 10/2005 | Bean | ................. | B66F 11/046 |
| | | | | 212/280 |
| 2005/0278099 A1* | 12/2005 | Benckert | ............... | B66C 13/40 |
| | | | | 701/50 |
| 2008/0191689 A1* | 8/2008 | Kraft | .................... | E02F 3/435 |
| | | | | 324/207.2 |
| 2013/0115034 A1 | 5/2013 | Subrt | | |

FOREIGN PATENT DOCUMENTS

| | | |
|---|---|---|
| DE | 102011018267 A1 | 10/2012 |
| DE | 102014007071 A1 | 11/2015 |
| WO | 2004020765 A1 | 3/2004 |

\* cited by examiner

LARGE MANIPULATOR HAVING AN ARTICULATED MAST AND HAVING MEANS FOR MEASURING ANGLES OF ROTATION

TECHNICAL FIELD

The invention relates to a large-scale manipulator having means for rotation angle measurement, and to a truck-mounted concrete pump having a large-scale manipulator according to the invention.

BACKGROUND

In order to be able to allow safe, easy and precise operation of a large-scale manipulator, the prior art proposes measuring the relative instantaneous folding angle of the individual boom segments, for example to determine the folded state of the folding boom, the damping of boom oscillations, load torque limitation or coordinate control. A large number of measuring methods that are suitable for this purpose are known from the prior art.

The folding angle can be sensed for example by mechanical rotation angle measuring systems. However, this is frequently too imprecise or too expensive. In particular, such sensing of the folding angle is difficult when, in the case of a large-scale manipulator of a thick matter pump, a thick matter delivery pipe is guided through the folding joints. Mechanical measurement with a rotation angle meter is only possible when additional mechanical deflection mechanisms are installed.

In addition, it is also known, for angle measurement, to measure the linear deflection of the drive units with which the boom segments are pivoted with respect to a respectively adjacent segment or with respect to the turntable, and to convert the measured deflection into the associated rotation angle of the joint.

However, a disadvantage here is that inaccuracies frequently occur on account of the conversion. Furthermore, the requisite measuring arrangement is complicated.

In order to sense the folding angle, angle sensors based on rotary potentiometers are also known. Potentiometer measurement converts rotary movements into a resistance value and has the advantage that an absolute value is available immediately after switching on. However, a disadvantage here is the mechanical wear. This changes the resistance over time and thus the measurement results are distorted. Also, with such measurements, any misalignment of the components with respect to one another is tolerable only to a very limited extent.

In order to make angle measurement more robust, inclination sensors are used in the prior art. However, a disadvantage here is that the inclination sensors also take into account the sag of the boom segments. This is disadvantageous in particular when, during the folding up of the folding boom for the driving mode of the truck-mounted concrete pump, the closing angle has to be determined. Furthermore, inclination sensors are expensive and, at the beginning of each measurement, it is absolutely necessary to calibrate the sensors. As a result, the use of inclination sensors is very complicated.

SUMMARY

Therefore, it is the object of the invention to provide an improved large-scale manipulator having means for rotation angle measurement. In particular, effective and accurate sensing of the folding angle between the individual boom segments is intended to be ensured in a simple manner.

This object is achieved by a large-scale manipulator having the features of claim 1 and by a truck-mounted concrete pump having the features of claim 15. Advantageous configurations are the subject matter of the respective dependent claims. It should be noted that the features listed individually in the claims can also be combined with one another in any desired, technologically appropriate manner and thus demonstrate further configurations of the invention.

A large-scale manipulator according to the invention comprises an extendable folding boom that has a turntable, which is rotatable about a vertical axis, and a plurality of boom segments, wherein the boom segments are pivotable to a limited extent at folding joints about respectively horizontal folding axes with respect to an adjacent boom segment or the turntable, by means of a respective drive unit. The device is distinguished by having at least one contactlessly operating rotation angle sensor for sensing the folding angle between two adjacent boom segments or between a boom segment and the adjacent turntable.

Compared with the prior art, the device according to the invention has the advantage that accurate, cost-effective and durable rotation angle measurement is possible as a result. On account of the mechanical separation between the individual components, mechanical wear does not occur. Furthermore, on account of the contactless angle measurement, certain tolerances between the components are admissible without this having a negative effect on the measured values.

Preferably, the contactlessly operating rotation angle sensor is a Hall sensor arrangement which has a Hall sensor and at least one movable magnet corresponding to the Hall sensor as elements of the rotation angle sensor. Depending on the position of the magnet with respect to the Hall sensor, the magnetic field generated by the magnet generates a magnetic flux through the Hall sensor and as a result a corresponding electrical signal at the output thereof.

On account of the use of a Hall sensor, high measurement accuracy can be ensured even in a harsh environment, for example in the case of humidity, dust or vibrations. Use in confined installation conditions is also possible on account of the very compact dimensions. Furthermore, lateral misalignment or a change in spacing between the magnet and sensor is tolerable without the measured values being distorted. Overall, very accurate and durable angle measurement can be ensured by the Hall sensor arrangement.

In order to detect predetermined positions, the Hall sensor can have an output for a digital signal. As a result, it is possible to detect and output the end positions of a movement. Depending on the signal strength, virtually any desired accurate end-position and position detection can be realized. It is also possible for the Hall sensor to have an output for an analog signal. In this case, the output signal changes depending on the change in the magnetic flux. This change occurs as soon as the at least one movable magnet executes a relative movement with respect to the Hall sensor. This possibility consequently also allows conclusions to be drawn about the current position between the two end positions.

Advantageously, axially scanning sensors are used. They provide reliable and precise results with regard to recording the rotation angle. However, it is in principle also possible to use radially scanning sensors for rotation angle measurement. For example, what are referred to as magnetic incremental encoders come into question, in which a magnetized ring with magnetic encoding is arranged for conjoint rotation on a rotating shaft. Located at the outer circumference, i.e. in the radial arrangement of the rotation axis, is a stationary sensor head which responds to the magnetic encoding and determines the rotation angle with a high degree of accuracy.

Preferably, the contactlessly operating rotation angle sensor is arranged directly on a folding axis. As a result, the folding angle between two adjacent boom segments can be directly sensed. No conversion is necessary.

The folding joint can be formed by a pivot bolt. The pivot bolt connects two adjacent boom segments together. Advantageously, the pivot bolt is connected to one of the boom segments for conjoint rotation. Preferably, to this end, the pivot bolt is fastened to one of the boom segments for conjoint rotation by means of a twist prevention means. A cohesive connection can exist between the pivot bolt and the twist prevention means. Preferably, the pivot bolt is fastened to the twist prevention means by means of welding. However, a form-fitting or frictional connection is also conceivable. The connection between the twist prevention means and the boom segment preferably takes place by means of a form-fitting or frictional connection. Advantageously, the twist prevention means and the boom segment are connected together by means of a screw.

In order to measure the rotary movement at the folding joint, one element of the rotation angle sensor can be arranged for conjoint rotation with the pivot bolt and the other rotation angle sensor element can be arranged at a distance therefrom on the boom segment that is pivotable relative to the pivot bolt or on the turntable. In the case of a Hall sensor arrangement, either the Hall sensor or the magnet corresponding thereto can be arranged on the pivot bolt. Preferably, one element of the rotation angle sensor is arranged on one of the end faces of the pivot bolt.

Advantageously, the elements of the rotation angle sensor are not connected directly to the boom segments or to the turntable. Holding elements connect the elements of the rotation angle sensor to the boom segments or to the turntable. Preferably, angled plates are used as holding elements. These provide the advantage that the spacing and the parallelism between the sensor elements can be set easily. If a misalignment between the elements that are movable relative to one another occurs in the event of the device being used for a relatively long time, then the misalignment can be easily compensated by the replacement or bending of the holding element, with the result that a constant spacing or parallelism between the sensor elements can be ensured and accurate angle measurement is allowed in the long term.

If direct angle measurement is not possible at the folding axis or at the pivot bolt, since for example a delivery pipe is guided through the folding joint, the rotary movement can be determined at one of the articulation points of the drive units and be converted into the absolute folding angle of the folding joint. According to the invention, the articulation points are the points at which the drive units are connected to the turntable or to the boom segments. The drive units are arranged so as to be pivotable relative to the turntable or to the boom segments. In order to measure the rotary movement at an articulation point, one element of the rotation angle sensor, for example the Hall sensor, can be connected to the drive unit for conjoint rotation and the other rotation angle sensor element, for example the at least one magnet, can be connected to the turntable or one of the boom segments for conjoint rotation. Advantageously, hydraulic cylinders are used as drive units.

Preferably, the rotation angle sensor is arranged at the lower articulation point of the drive unit. This has the advantage that the wiring complexity can be kept low.

In principle, however, it is also possible for the contactlessly operating rotation angle sensor to be arranged at other pivot points of the device in order to be used for indirect determination of the folding angle between two adjacent boom segments or between boom segment and turntable. In this case all that needs to be taken into consideration is that the rotation angle of the boom segment has to be able to be derived clearly from the measured rotation angle.

If the large-scale manipulator has at least one bell crank, one element of the rotation angle sensor can be arranged at a pivot point of the bell crank of a folding joint. The rotation angle sensor in this case determines the rotary movement of the bell crank relative to the boom segment or relative to another bell crank, with the result that the absolute folding angle of the folding joint between two adjacent boom segments is able to be calculated from the sensor signal.

In order to be able to achieve redundancies during the measurement of the rotation angle, several rotation angle sensors can sense the folding angle of a boom joint. As a result, if a sensor fails, further operation or emergency operation with the remaining sensors is additionally possible. The sensors can be arranged at opposite ends of a pivot bolt. Since the rotation angle sensors can sense the rotary movement, in opposite directions, the rotation angle can be determined therefrom with a high degree of accuracy.

Furthermore, the sensors can also be arranged at different pivot points of a folding joint, which are defined via the bell crank, belonging to the respective folding joint, of the joint kinematics. The rotation angle between the boom segments can also be calculated with increased accuracy, depending on the sensor arrangement, from the output signals of several rotation angle sensors.

A further improvement in measurement accuracy can additionally be achieved in that two sensor arrangements are arranged on a boom joint such that a sensor arrangement senses the rotation angle directly at a pivot bolt and a second sensor arrangement senses the rotation angle indirectly, for example at the articulation point of a drive unit or at a deflection point of the joint kinematics. As a result of computational superimposition of the linear measurement signal of the sensor arrangement at the pivot bolt on a nonlinear measurement signal of a sensor arrangement at a bell crank or the articulation of a drive unit, the actual rotation angle of the folding axis can be determined with increased accuracy.

It is also possible to sense the rotation angle with two or more sensor arrangements at a folding joint, none of the rotation angle sensor arrangements sensing the rotation angle directly at the pivot bolt. With such a sensor arrangement, the rotation angle can also be computationally derived with increased accuracy from the indirectly sensed measurement signals of the sensor arrangements by superimposition.

The large-scale manipulator according to the invention is preferably used to dispense thick matter. In particular, it serves to deliver concrete.

A further subject of the invention is a truck-mounted concrete pump. The truck-mounted concrete pump according to the invention has a chassis, a thick matter pump, in particular concrete pump, arranged on the chassis, and a large-scale manipulator having the above-described rotation angle sensor system.

The large-scale manipulator according to the invention can also have support systems. The support transfers the tilting moment to the standing surface of the large-scale manipulator and as a result prevents the large-scale manipulator with the boom from toppling over. In order to be able to allow safe, easy and precise operation of a large-scale manipulator, it is in principle conceivable for the pivot angles of the supports to be sensed, in particular in the case of folding supports. As a result, it is possible, inter alia, to ensure that the supports have also actually been extended to the desired deflection before starting to extend the boom. In addition, such sensors can be used to determine the spreading angle of only partially extended folding supports in order, on the basis of this information, to limit the working range of the boom arm because the full working range of the concrete pump boom arm can no longer be used with only partially extended supports. The pivot angles of the supports, which are configured for example as folding supports, can advantageously be sensed by means of the above-described contactless rotation angle sensor system.

The invention and the technical context are explained in more detail in the following text by way of the figures. It should be noted that the figures show particularly preferred embodiment variants of the invention. The invention is not limited to the embodiment variants shown, however. In particular, the invention comprises any desired combinations of the technical features which are listed in the claims or are described as being relevant to the invention in the description, where technically appropriate.

DETAILED DESCRIPTION

Figure 1:
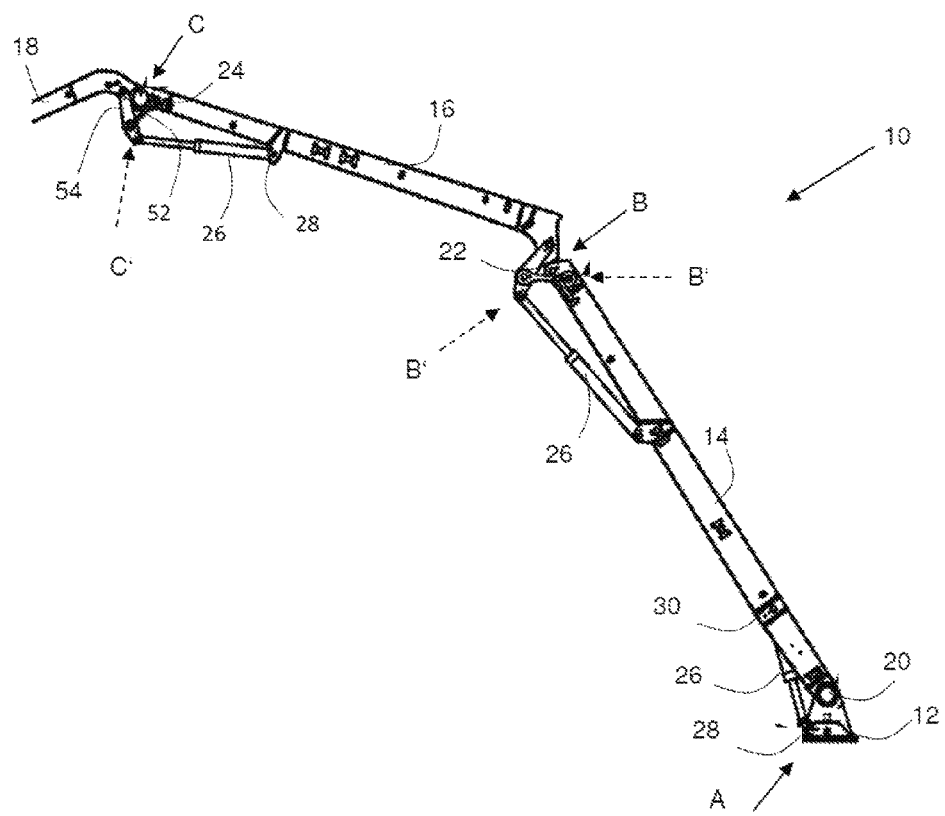
FIG. 1 shows a schematic illustration of a large-scale manipulator according to the invention having means for rotation angle measurement.

FIG. 1 shows a schematic illustration of a large-scale manipulator 10 according to the invention having means for rotation angle measurement. The device 10 has an extendable folding boom having a turntable 12, which is rotatable about a vertical axis, and a plurality of boom segments 14, 16, 18. The boom segments 14, 16, 18 are pivotable to a limited extent at folding joints 20, 22, 24 about respectively horizontal folding axes with respect to an adjacent boom segment 14, 16, 18 or the turntable 12, by means of a respective drive unit 26. The folding boom preferably has between three and five boom segments 14, 16, 18. The device 10 has at least one contactlessly operating rotation angle sensor 38, 38' (see FIGS. 2 and 3) for sensing the folding angle between two adjacent boom segments 14, 16, 18. Preferably, the rotary movement is measured directly at a pivot bolt 32 (see FIGS. 2 and 3). Since a concrete delivery pipe 50 has to be guided through a hollow bolt 46 through some folding joints 20, 22, 24, these are not suitable for attachment of the rotation angle sensor 38, 38', as described in FIGS. 2 and 3. In this case, the rotation angle measurement preferably takes place at the measurement points A and/or C or at the measurement points A, B' and C or C', respectively. The measurement point C at the pivot point between the boom segment 16 and the bell crank 54 is preferred here on account of the wiring complexity along the mast, but the measurement point C', the pivot point between the bell cranks 52 and 54, is also possible.

Figure 2:
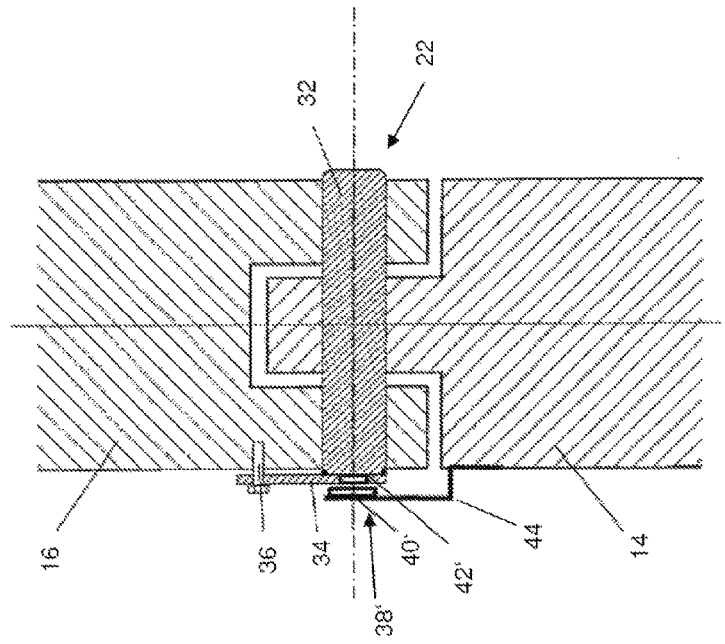
FIG. 2 shows a schematic sectional illustration through a folding joint of the large-scale manipulator.

FIG. 2 shows a schematic sectional illustration through a folding joint 22 in a first embodiment. Arranged at the folding joint 22 is a pivot bolt 32. The pivot bolt 32 connects a first boom segment 14 and a second boom segment 16 together such that the boom segments 14, 16 are pivotable relative to one another at the folding joint 22 about a horizontal folding axis (illustrated as a dot-dash line in FIG. 2) by means of the corresponding drive unit. The pivot bolt 32 is connected to the boom segment 16 for conjoint rotation. The pivot bolt 32 is thus pivotable or rotatable relative to the boom segment 14, just like the boom segment 16. Preferably, the pivot bolt 32 is fastened to the boom segment 16 for conjoint rotation by means of a twist prevention means 34. A cohesive connection, for example by means of welding or adhesive bonding, can exist between the pivot bolt 32 and the twist prevention means 34. However, a form-fitting or frictional connection is also conceivable. The connection between the twist prevention means 34 and boom segment 16 preferably takes place by means of a form-fitting or frictional connection. To this end, a screw connection 36 is advantageously used.

In order to directly sense the folding angle between the two adjacent boom segments 14, 16, a contactlessly operating rotation angle sensor is arranged at the folding joint 22. The rotation angle sensor is a Hall sensor arrangement 38 which has a Hall sensor 40 and at least one movable magnet 42 corresponding to the Hall sensor 40. One element of the rotation angle sensor, preferably the Hall sensor 40, can be arranged directly on the pivot bolt 32. Preferably, the Hall sensor 40 is arranged on an end face of the pivot bolt 32. The other element of the Hall sensor arrangement 38, the magnet 42, is arranged, so as to be spaced apart therefrom in a parallel manner, on a holder 44 which is connected to the first boom segment 14. Preferably, the holder 44 is an angled plate. If a relative movement occurs between the boom segments 14, 16, the magnetic field changes and the folding angle between the boom segments 14, 16 can be determined directly therefrom. However, an inverted arrangement of the elements of the Hall sensor arrangement is also conceivable, wherein the Hall sensor 40 is then arranged on the holder 44.

Figure 3:
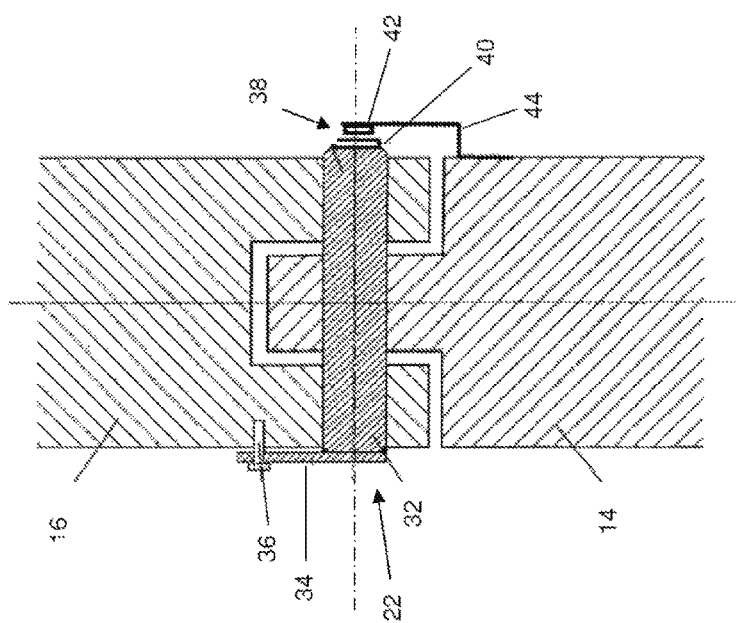
FIG. 3 shows a schematic sectional illustration through a folding joint in a further embodiment.

FIG. 3 shows a schematic sectional illustration through a folding joint 22 in a further embodiment. Arranged at the folding joint 22 is a pivot bolt 32. The pivot bolt 32 connects the first boom segment 14 and the second boom segment 16 together such that the boom segments 14, 16 are pivotable relative to one another about the horizontal folding axis (illustrated as a dot-dash line in FIG. 3). The pivot bolt 32 is connected to the boom segment 16 for conjoint rotation by a twist prevention means 34.

In order to directly sense the folding angle between the two adjacent boom segments 14, 16, a Hall sensor arrangement 38', which has a Hall sensor 40' and at least one movable magnet 42' corresponding to the Hall sensor 40', is arranged in the folding joint 22 on the folding axis. The magnet 42' of the Hall sensor arrangement 38' is arranged on the twist prevention means 34, preferably in a cutout. The Hall sensor 40' is arranged, so as to be spaced apart therefrom in a parallel manner, on a holder 44 which is connected to the first boom segment 14. If a relative movement occurs between the boom segments 14, 16, the magnetic field changes and the folding angle between the boom segments 14, 16 can be determined directly therefrom. However, an inverted arrangement of the Hall sensor elements is also conceivable, such that the magnet 42' is arranged on the holder 44 and the Hall sensor 40' is arranged on the twist prevention means 34.

The attachment of the rotation angle sensor at the pivot points of the bell crank (52, 54) can take place, analogously thereto, at the pivot bolts and is not described in more detail here.

Figure 4:
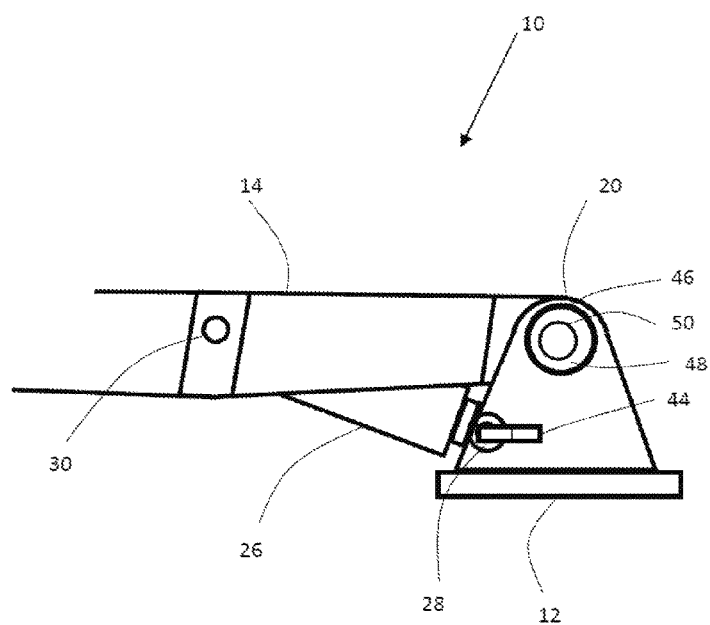
FIG. 4 shows a schematic illustration of part of a large-scale manipulator according to the invention.

FIG. 4 shows a schematic illustration of a detail of a large-scale manipulator 10 according to the invention. A boom segment 14 is arranged so as to be pivotable at a folding joint 20 about a horizontally extending folding axis with respect to a turntable 12, which is rotatable about a vertical axis, by means of a drive unit 26. The folding joint 20 is equipped here with a hollow bolt 46 having a delivery pipe feedthrough 48 for a concrete delivery pipe 50. Direct measurement of the folding angle with the arrangement described in conjunction with FIGS. 2 and 3 is not possible here. The drive unit 26 is preferably a hydraulic cylinder which is connected to the turntable 12 at a lower articulation point 28 and to the first boom segment 14 at an upper articulation point 30. The rotary movement is determined here at one of the articulation points of the drive units 26. The determined rotary movement is converted into the absolute rotation angle of the pivot joint 20. Preferably, the contactlessly operating rotation angle sensor 38, 38' is arranged at the lower articulation point 28 and senses the rotary movement of the drive unit 26 relative to the turntable 12 at the articulation point.

In order to achieve redundancy during the measurement of the rotation angle, i.e. to be able to compare two angle measurements together as a failsafe, two contactlessly measuring rotation angle sensor arrangements 38 can be arranged on opposite sides of a pivot bolt 32. Because the two rotation angle sensors 38 then sense the rotary movement in opposite directions, the rotation angle can additionally be determined therefrom with increased accuracy and, if one sensor fails, emergency operation with one rotation angle sensor 38 is still possible.

10 Large-scale manipulator
12 Turntable
14 First boom segment
16 Second boom segment
18 Third boom segment
20 First folding joint
22 Second folding joint
24 Third folding joint
26 Drive unit
28 Lower articulation point
30 Upper articulation point
32 Pivot bolt
34 Twist prevention means
36 Screw
38, 38' Rotation angle sensor arrangement
40, 40' Hall sensor
42, 42' Magnets
44 Holder
46 Hollow bolt
48 Delivery pipe feedthrough
50 Delivery pipe
52, 54 Bell crank
A, B, C Measurement points
A', B', C' Measurement points

The invention claimed is:

1. An extendable folding boom comprising:
   a turntable rotatable about a vertical axis;
   a plurality of boom segments pivotable at folding joints about respectively horizontal folding axes with respect to an adjacent boom segment or the turntable;
   a pivot bolt extending along one of the respective horizontal folding axes, wherein the pivot bolt couples a first and a second boom segment together and is pivotable relative to the second boom segment; and
   a sensor configured to sense a folding angle between two adjacent boom segments or between a boom segment and the turntable, the sensor including a field-generating element and a field-sensing element spaced apart from each other along a horizontal axis in a contactless arrangement, wherein one of the field-generating element and the field-sensing element is directly coupled to an end face of the pivot bolt.

2. The extendable folding boom of claim 1, wherein the field-sensing element is a Hall sensor and the field-generating element is a magnet rotatable with respect to the field-sensing element.

3. The extendable folding boom of claim 1, wherein the field-sensing element is spaced apart from the field-generating element along one of the respective horizontal folding axes.

4. The extendable folding boom of claim 1, wherein the field-generating element is positioned on the pivot bolt.

5. The extendable folding boom of claim 1, further comprising:
   a twist prevention means coupled between the pivot bolt and one of the plurality of boom segments.

6. The extendable folding boom of claim 5, wherein either the field-generating element or the field-sensing element is positioned on the twist prevention means.

7. The extendable folding boom of claim 1, further comprising:
   an angled plate that couples the field-sensing element to one of the plurality of boom segments.

8. The extendable folding boom of claim 1, further comprising:
   a drive unit configured to rotate at least one of the plurality of boom segments around the respective horizontal folding axes, wherein either the field-generating element or the field-sensing element is positioned on the drive unit.

9. The extendable folding boom of claim 1, wherein the folding joint includes a bell crank, and wherein either the field-generating element or the field-sensing element is positioned at a pivot point of the bell crank.

10. The extendable folding boom of claim 9, wherein the sensor is configured to determine rotary movement of the bell crank relative to the one of the plurality of boom segments or relative to another bell crank.

11. The extendable folding boom of claim 1, further comprising:
   a plurality of sensors, wherein each sensor is configured to sense a folding angle between two adjacent boom segments or between a boom segment and the turntable.

12. The extendable folding boom of claim 11, wherein one of the plurality of sensors is positioned on a first side of the pivot bolt, and wherein another of the plurality of sensors is positioned on a second side of the pivot bolt opposite the first side.

13. The extendable folding boom of claim 11, wherein one of the plurality of sensors is positioned at a first pivot point of a folding joint, and wherein another of the plurality of sensors is positioned at a second pivot point of the folding joint.

14. The extendable folding boom of claim 1, wherein the pivot bolt is a solid bolt.

15. The extendable folding boom of claim 1, wherein the pivot bolt is not hollow.

\* \* \* \* \*